Patented Dec. 4, 1951

2,577,409

UNITED STATES PATENT OFFICE 2,577,409

ALLYL ISOTHIOCYANO ETHERS

William S. Emerson and Raymond I. Longley, Jr., Dayton, Ohio, assignors to Monsanto Chemical Company, St. Louis, Mo., a corporation of Delaware No Drawing. Application March 6, 1948, Serial No. 13,528

16 Claims. (Cl. 260—454)

This invention relates to isothiocyano ethers. More particularly it relates to compounds which may be considered as alkoxy derivatives of allyl isothiocyanates.

The presence of ether groups and unsaturated groups in addition to the isothiocyano group in a single molecule contribute exceptional properties which render the compounds valuable for a number of industrial applications, as for example insecticides, and they are, in addition, important organic intermediates.

The compounds of this invention are allyl isothiocyanates in which one of the hydrogen atoms of the allyl isothiocyanate is replaced by a substituent comprising an alkoxy group. In the preferred form the invention relates to alkoxy alkyl substituted allyl isothiocyanates which may be represented by the general formula

RO—R'—(C$_3$H$_4$)—NCS where RO is an alkoxy group such as methoxy, ethoxy, propoxy, isopropoxy, butoxy, isobutoxy, amyloxy, and the like; and wherein R' is an alkylene radical such as ethylene, propylene, isopropylene, butylene, isobutylene, amylene, isoamylene. R' may also be a substituted alkylene such as an aryl substituted alkylene, as for example phenyl ethylene, phenyl propylene and the like.

Members of the class of new ether derivatives of allyl isothiocyanates of the above identified formula may be prepared by reacting an alkoxy alkyl susbtituted allyl halide with a salt of thiocyanic acid. Alkoxy alkyl substituted allyl halides are well known in the art and are formed by reacting a halogenated ether with an aliphatic diene (German Patent 647,192). Typical examples are 5-alkoxy-3-chloro-1-pentene, 5-alkoxy-1-chloro-2-pentene, 5-alkoxy-3-chloro-1-hexene, alkoxy-1-chloro-2-hexene, 6-alkoxy-3-chloro-1-hexene, 6-alkoxy-1-chloro-2-hexene, 6-alkoxy-3-chloro-1-heptene, 6-alkoxy-1-chloro-2-heptene, 7-alkoxy-3-chloro-1-heptene, 7-alkoxy-1-chloro-2-heptene, 4-alkoxy-3-chloro-1-pentene, 5-alkoxy-4-methyl-3-chloro-1-pentene, 5-alkoxy-4,5-dimethyl-3-chloro-1-pentene, 5-alkoxy-4-methyl-1-chloro-2-pentene, 6-alkoxy-4-methyl-3-chloro-1-hexene, 6-alkoxy-4-methyl-1-chloro-2-hexene, 6-alkoxy-4,5-dimethyl 3-chloro-1-hexene, 5-alkoxy-2-chloromethyl-2-pentene, 6-alkoxy-2-chloromethyl-2-hexene and 6-alkoxy-2-chloromethyl-2-heptene, wherein the alkoxy group is methoxy, propoxy, isopropoxy, butoxy, isobutoxy, amyloxy, and the like.

Aryl susbtituted alkoxy alkyl allyl isothiocyanates may be prepared in similar manner from such halides as 5-methoxy-5-phenyl-1-chloro-2-pentene, and 5-methoxy-5-phenyl-4-methyl-1-chloro-2-pentene. These intermediates may in turn be obtained according to the method described in British Patent 446,041.

The making of the new compounds is illustrated by the formation of 5-methoxy-3-isothiocyano-1-pentene in accordance with the following equation:

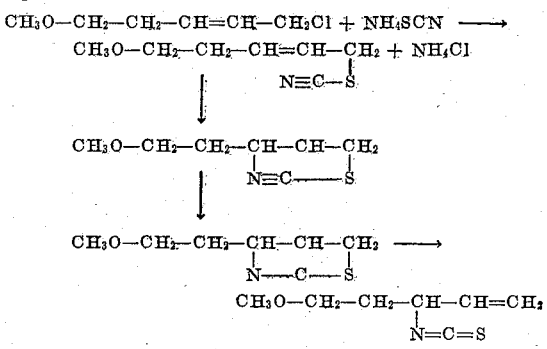

It will be noted that the thiocyanate presumably formed at an intermediate stage undergoes an allylic rearrangement. The mechanism of the formation of the isothiocyanate by an allylic rearrangement is that proposed by Schlenk and Bergman, "Lehrbuch der Organischen Chemie," 1932, vol. 1, p. 609. However, the present invention is not limited by any theory of the mechanism by which the new compounds are produced.

Other salts of thiocyanic acid may be employed where desired. In addition to the ammonium salt, the lead salt, the alkali metal salts such as sodium or potassium thiocyanate and the alkaline earth metal salts are suitable. The reaction with a thiocyanate may be carried out by heating the reactants in a solvent such as alcohol with constant agitation and the by-product salt removed in a suitable manner, as for example filtering from a solvent medium in which it is insoluble. The product may be recovered as residue after the removal of the solvent. Where desired the products may be further purified by again diluting with a solvent and removing any further by-product materials by filtering or by distillation under reduced pressure or both. However, distillation generally results in some loss due to decomposition. Solvents other than alcohol may be used, e. g. water or a mixture of alcohol and water.

Examples of chemicals within this invention are 5-methoxy-1-isothiocyano-2-pentene, 5- methoxy-3-isothiocyano-1-pentene, 5-methoxy-1-isothiocyano-2-hexene, 5-methoxy-3-isothiocyano-1-hexene, 6-methoxy-1-isothiocyano-2-hexene, 6-methoxy-3-isothiocyano-1-hexene, 6-methoxy-1-isothiocyano-2-heptene, 6-methoxy-3-isothiocyano-1-heptene, 7-methoxy-1-isothiocyano-2-heptene, 7-methoxy-3-isothiocyano-1-heptene, 4-methoxy-1-isothiocyano-2-pentene, 5-methoxy-4-methyl-1-isothiocyano-2-pentene, 5-methoxy-4,5-dimethyl-1-isothiocyano-2-pentene, 5-methoxy-4-methyl-3-isothiocyano-1-pentene, 6-methoxy-4-methyl-1-isothiocyano-2-hexene, 6-methoxy-4-methyl-3-isothiocyano-1-hexene, 6-methoxy-4,5-dimethyl-1-isothiocyano-2-hexene, 5-methoxy-5-phenyl-3-isothiocyano-1-pentene, 5-methoxy-5-phenyl-4-methyl-3-isothiocyano-1-pentene, and 5-methoxy-3-isothiocyano-2-methyl-1-pentene.

The following examples illustrate in detail the preparation of certain compounds falling within the scope of the invention but are not to be construed as limiting the same.

*Example 1*

A solution of 88.5 grams (substantially 0.5 mol) of 5(n-butoxy)-3-chloro-1-pentene and 51 grams (substantially 0.67 mol) of ammonium thiocyanate in 200 ml. of absolute ethanol was heated under reflux with agitation for one hour. The precipitate was filtered in order to separate the ammonium chloride and the residue was washed with ethanol. The combined alcohol washings and filtrate were distilled at reduced pressure to remove the alcohol. The residue was diluted with 100 ml. of ether and filtered. The filtrate was distilled yielding a residual oil, 5(n-butoxy)-1-isothiocyano-2-pentene, weighing 69 grams, which boiled between 94° C./2.5 mm. and 126°/2.0 mm. This oil was redistilled and boiled at 136°-140° C. at 5 mm. and possessed the constant $N_D^{25}$ 1.4985. Analysis of the product gave 16.4% sulfur, theoretical sulfur 16.5%.

*Example 2*

A solution of 88.5 grams (substantially 0.5 mol) of 5(n-butoxy)-1-chloro-2-pentene and 51 grams (0.67 mol) of ammonium thiocyanate in 200 ml. of absolute ethanol was heated under reflux with agitation for one hour. The precipitate was filtered in order to separate the ammonium chloride and the residue was washed with ethanol. The combined alcohol washings and filtrate were distilled at reduced pressure in order to remove the alcohol. The residue was diluted with 100 ml. of ether and filtered. The filtrate was distilled yielding a residual oil, 5(n-butoxy)-3-isothiocyano-1-pentene, weighing 85 grams, which boiled at 118°-119° C./5 mm. and possessed the physical constant $N_D^{25}$ 1.4880. Analysis of the product gave 17.0% sulfur, theoretical sulfur 16.5%.

*Example 3*

A solution of 134 grams (substantially 1 mol) of 5-methoxy-3-chloro-1-pentene and 100 grams (substantially 1.3 mols) of ammonium thiocyanate in 300 ml. of ethanol was heated at the reflux temperature with agitation for two hours. The precipitate was filtered in order to separate the ammonium chloride and the residue washed with alcohol. The combined washings and filtrate were distilled at reduced pressure to remove the alcohol. The residue was diluted with 100 ml. of ether and filtered. The filtrate was distilled yielding an oil which was redistilled to obtain pure 5-methoxy-1-isothiocyano-2-pentene. The oil had a boiling point of 105°-107°/5 mm. and had the physical constant $N_D^{25}$ 1.5154. Analysis of the product yielded 20.7% sulfur, theoretical sulfur 21.05%.

*Example 4*

In the same manner as described in Example 2 above, 5-methoxy-1-chloro-2-pentene was reacted with ammonium thiocyanate. The product, 5-methoxy-3-isothiocyano-1-pentene, boiled at 87°-88° C./5 mm. $N_D^{25}$ 1.5020, $D_{25}^{25}$ 1.016

Analysis: calc'd. for $C_7H_{11}ONS$: S, 21.0%; found: S, 21.1%.

As will be readily appreciated, other methods of synthesis may be employed than those suggested and numerous modifications of the specific embodiments enumerated above may be made without departing from the spirit or scope of the present invention.

What is claimed is:

1. 5(n-butoxy)-3-isothiocyano-1-pentene.
2. The method of making 5(n-butoxy)-1-isothiocyano-2-pentene which comprises condensing 5(n-butoxy)-3-chlor-1-pentene and a salt of thiocyanic acid.
3. The method of making 5(n-butoxy)-3-isothiocyano-1-pentene which comprises condensing 5(n-butoxy)-1-chloro-2-pentene and a salt of thiocyanic acid.
4. The method of making 5-methoxy-3-isothiocyano-1-pentene which comprises condensing 5-methoxy-1-chloro-2-pentene and a salt of thiocyanic acid.
5. Alkoxy alkyl allyl isothiocyanates of the general formula:

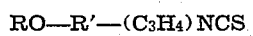
RO—R'—(C₃H₄)NCS where R is an alkyl radical and R' is an alkylene radical, and wherein the ROR'— radical and the —NCS radical are each directly attached to a carbon atom of the $C_3H_4$ radical, the —NCS radical being attached to the carbon atom of the $C_3H_4$ radical not carrying the double bond.

6. Alkoxy alkyl allyl isothiocyanates of the general formula:

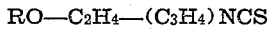
RO—C₂H₄—(C₃H₄)NCS where R is an alkyl radical and wherein the RO—C₂H₄— radical and the —NCS radical are each directly attached to a carbon atom of the $C_3H_4$ radical, the —NCS radical being attached to the carbon atom of the $C_3H_4$ radical not carrying the double bond.

7. Alkoxy alkyl allyl isothiocyanates of the general formula:

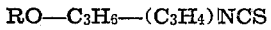
RO—C₃H₆—(C₃H₄)NCS where R is an alkyl radical and wherein the RO—C₃H₆— radical and the —NCS radical are each directly attached to a carbon atom of the $C_3H_4$ radical, the —NCS radical being attached to the carbon atom of the $C_3H_4$ radical not carrying the double bond.

8. Alkoxy alkyl allyl isothiocyanates of the general formula:

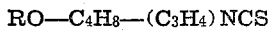
RO—C₄H₈—(C₃H₄)NCS where R is an alkyl radical and wherein the RO—C₄H₈— radical and the —NCS radical are each directly attached to a carbon atom of the $C_3H_4$ radical, the —NCS radical being attached to the carbon atom of the $C_3H_4$ radical not carrying the double bond.

9. Alkoxy alkyl allyl isothiocyanates of the general formula:

$$RO-R'-(C_3H_4)NCS$$

where R is an alkyl radical and R' is an alkylene radical containing from 2 to 6 carbon atoms, and wherein the RO—R'— radical and the —NCS radical are each directly attached to a carbon atom of the C₃H₄ radical, the —NCS radical being attracted to the carbon atom of the C₃H₄ radical not carrying the double bond.

10. Alkoxy alkyl allyl isothiocyanates of the general formula:

$$RO-C_2H_4-(C_3H_4)NCS$$

where R contains less than 6 carbon atoms and wherein the RO—C₂H₄— radical and the —NCS radical are each directly attached to a carbon atom of the C₃H₄ radical, the —NCS radical being attached to the carbon atom of the C₃H₄ radical not carrying the double bond.

11. Alkoxy alkyl allyl isothiocyanates of the general formula:

$$RO-C_3H_6-(C_3H_4)NCS$$

where R contains less than 6 carbon atoms and wherein the RO—C₃H₆— radical and the —NCS radical are each directly attached to a carbon atom of the C₃H₄ radical, the —NCS radical being attached to the carbon atom of the C₃H₄ radical not carrying the double bond.

12. Alkoxy alkyl allyl isothiocyanates of the general formula:

$$RO-C_4H_8-(C_3H_4)NCS$$

where R contains less than 6 carbon atoms and wherein the RO—C₄H₈— radical and the —NCS radical are each directly attached to a carbon atom of the C₃H₄ radical, the —NCS radical being attached to the carbon atom of the C₃H₄ radical not carrying the double bond.

13. The method of making alkoxy alkyl allyl isothiocyanates of the general formula:

$$RO-R'-(C_3H_4)NCS$$

where R is an alkyl radical and R' is an alkylene radical and wherein the RO—R'— radical and the —NCS radical are each directly attached to a carbon atom of the C₃H₄ radical, the —NCS radical being attached to the carbon atom of the C₃H₄ radical not carrying the double bond, which comprises condensing an alkoxy alkyl allyl halide, wherein the halogen is attached to a carbon atom of the allyl group not carrying the double bond, with a salt of thiocyanic acid.

14. The method of making an alkoxy ethylene allyl isothiocyanate wherein the alkoxy ethylene radical and the —NCS radical are each directly attached to a carbon atom of the allyl radical, the —NCS radical being attached to the carbon atom of the allyl radical not carrying the double bond, which comprises condensing an alkoxy alkyl allyl halide, wherein the halogen is attached to a carbon atom of the allyl group not carrying the double bond, with a salt of thiocyanic acid.

15. The method of making an alkoxy propylene allyl isothiocyanate wherein the alkoxy propylene radical and the —NCS radical are each directly attached to a carbon atom of the allyl radical, the —NCS radical being attached to the carbon atom of the allyl radical not carrying the double bond, which comprises condensing an alkoxy alkyl allyl halide, wherein the halogen is attached to a carbon atom of the allyl group not carrying the double bond, with a salt of thiocyanic acid.

16. The method of making an alkoxy butylene allyl isothiocyanate, wherein the alkoxy butylene radical and the —NCS radical are each directly attached to a carbon atom of the allyl radical, the —NCS radical being attached to the carbon atom of the allyl radical not carrying the double bond, which comprises condensing an alkoxy alkyl allyl halide, wherein the halogen is attached to a carbon atom of the allyl group not carrying the double bond, with a salt of thiocyanic acid.

WILLIAM S. EMERSON.
RAYMOND I. LONGLEY, JR.

REFERENCES CITED

The following references are of record in the file of this patent:

UNITED STATES PATENTS

| Number | Name | Date |
|---|---|---|
| 2,395,454 | Bruson | Feb. 26, 1946 |

FOREIGN PATENTS

| Number | Country | Date |
|---|---|---|
| 446,041 | Great Britain | Apr. 23, 1936 |
| 647,192 | Germany | July 12, 1937 |